US008780591B2

(12) United States Patent
Pasuri et al.

(10) Patent No.: US 8,780,591 B2
(45) Date of Patent: Jul. 15, 2014

(54) FREQUENCY CONVERTER ASSEMBLY

(75) Inventors: Osmo Pasuri, Ojakkala (FI); Jukka Ylppö, Helsinki (FI)

(73) Assignee: ABB Oy, Helsinki (FI)

( * ) Notice: Subject to any disclaimer, the term of this patent is extended or adjusted under 35 U.S.C. 154(b) by 288 days.

(21) Appl. No.: 13/253,396

(22) Filed: Oct. 5, 2011

(65) Prior Publication Data

US 2012/0099347 A1    Apr. 26, 2012

(30) Foreign Application Priority Data

Oct. 21, 2010  (FI) ...................................... 20106087

(51) Int. Cl.
*H02M 5/451* (2006.01)
(52) U.S. Cl.
USPC ............................................... 363/35; 363/37
(58) Field of Classification Search
USPC .......................................... 363/34, 35, 37, 38
See application file for complete search history.

(56) References Cited

U.S. PATENT DOCUMENTS 4,618,803 A    10/1986  Hardy
7,324,849 B1 *  1/2008  Fayram et al. .................. 607/29

FOREIGN PATENT DOCUMENTS

CN    1578110 A    2/2005
FI    116336 B    10/2005

OTHER PUBLICATIONS

Finnish Search Report dated Mar. 29, 2011.
Capacitor reforming instructions—Converter modules with electrolytic DC capacitors in the DC link. 2009, 14 pages.
Dec. 4, 2013 Chinese Office Action issued in Chinese Patent Application No. 201110330043.2.

\* cited by examiner

*Primary Examiner* — Harry Behm
*Assistant Examiner* — Matthew Grubb
(74) *Attorney, Agent, or Firm* — Buchanan Ingersoll & Rooney PC

(57) ABSTRACT

A frequency converter assembly including an input for supplying electric power having an input frequency into the frequency converter assembly from a supply network, a direct voltage intermediate circuit having capacitor component, and at least one controllable switch. The switch being electrically positioned between the input and the direct voltage intermediate circuit. The assembly also includes an output for supplying electric power having an output frequency from the frequency converter assembly, and control component arranged to control the at least one controllable switch. The control component provides a recovery function to recover the capacitor component by supplying restricted recovery current from the supply network to the capacitor component through the at least one controllable switch, the control means also prevents supply of electric power from the direct voltage intermediate circuit towards the output during the recovery function.

19 Claims, 1 Drawing Sheet

FREQUENCY CONVERTER ASSEMBLY

RELATED APPLICATION

This application claims priority under 35 U.S.C. §119 to Finnish Patent Application No. 20106087 filed on Oct. 21, 2010, the entire content of which is hereby incorporated by reference in its entirety.

FIELD

The disclosure relates to a frequency converter, such as a frequency converter assembly having a capacitor.

BACKGROUND INFORMATION

Known direct voltage intermediate circuits of a frequency converter are usually provided with capacitor means. The capacitor means can include electrolytic capacitors. Electrolytic capacitors can be specified for recovery if they have been inactive for a sufficiently long time. It is known to recover the electrolytic capacitors of a direct voltage intermediate circuit of a frequency converter by using a recovery circuit that includes a voltage source and a current-limiting resistor.

SUMMARY

An exemplary frequency converter assembly is disclosed. The assembly comprising an input for supplying electric power having an input frequency into the frequency converter assembly from a supply network, a direct voltage intermediate circuit having capacitor means, at least one controllable switch electrically positioned between the input and the direct voltage intermediate circuit, an output for supplying electric power having an output frequency from the frequency converter assembly, control means for controlling the at least one controllable switch, providing a recovery function to recover the capacitor means by supplying restricted recovery current from the supply network to the capacitor means through the at least one controllable switch, and preventing a supply of electric power from the direct voltage intermediate circuit towards the output during the recovery function; and clock means for measuring an inactive time of the capacitor means, wherein when an inactive time of the capacitor means measured by the clock means exceeds a predetermined recovery requirement limit value, the control means prevents the supply of electric power from the direct voltage intermediate circuit towards the output and allowing supply of electric power from the direct voltage intermediate circuit towards the output only after a recovery process has been completed.

An exemplary method of monitoring a recover requirement of a capacitor means in a frequency converter assembly including an input for supplying electric power having an input frequency into the frequency converter assembly from a supply network, a direct voltage intermediate circuit having a capacitor, at least one controllable switch electrically positioned between the input and the direct voltage intermediate circuit, an output for supplying electric power having an output frequency from the frequency converter assembly, a controller, and a clock is disclosed. The method comprises controlling the at least one controllable switch; executing a recovery process by supplying restricted recovery current from the supply network to the capacitor through the at least one controllable switch; preventing a supply of electric power from the direct voltage intermediate circuit towards an output of the frequency converter assembly during the recovery process; and allowing supply of electric power from the direct voltage intermediate towards an output only after the recovery process has been completed.

An exemplary frequency converter assembly is disclosed. The frequency converter assembly comprising an input for supplying electric power having an input frequency into the frequency converter assembly from a supply network; a direct voltage intermediate circuit having a capacitor; at least one controllable switch electrically positioned between the input and the direct voltage intermediate circuit; an output that supplies electric power having an output frequency from the frequency converter assembly; a controller that controls the at least one controllable switch, providing a recovery function to recover the capacitor by supplying restricted recovery current from the supply network to the capacitor through the at least one controllable switch, and prevents a supply of electric power from the direct voltage intermediate circuit towards the output during the recovery function; and a clock that measures an inactive time of the capacitor, wherein when an inactive time of the capacitor measured by the clock exceeds a predetermined recovery requirement limit value, the controller prevents the supply of electric power from the direct voltage intermediate circuit towards the output and allowing supply of electric power from the direct voltage intermediate circuit towards the output only after the recovery function has been completed.

BRIEF DESCRIPTION OF THE DRAWINGS

The disclosure will now be described in more detail in connection with preferred embodiments, referring to the attached drawings, of which.

DETAILED DESCRIPTION

An exemplary embodiment of the present disclosure is directed to providing a frequency converter assembly having capacitor means. The capacitor means of which do not require the use of an external recovery circuit.

The disclosure is based on recovering capacitor means of a direct voltage intermediate circuit in a frequency converter assembly by supplying restricted recovery current from a supply network to the capacitor means through at least one controllable switch electrically positioned between the input and the direct voltage intermediate circuit of the frequency converter assembly while the frequency converter assembly automatically monitors the recovery requirement of the capacitor means and, if specified, prevents the frequency converter from being loaded before the recovery has been completed.

An advantage of an exemplary frequency converter assembly of the disclosure is that the frequency converter assembly is capable of automatically monitoring the recovery requirement of the capacitor means and to recover the capacitor means without an external voltage source.

Figure 1:
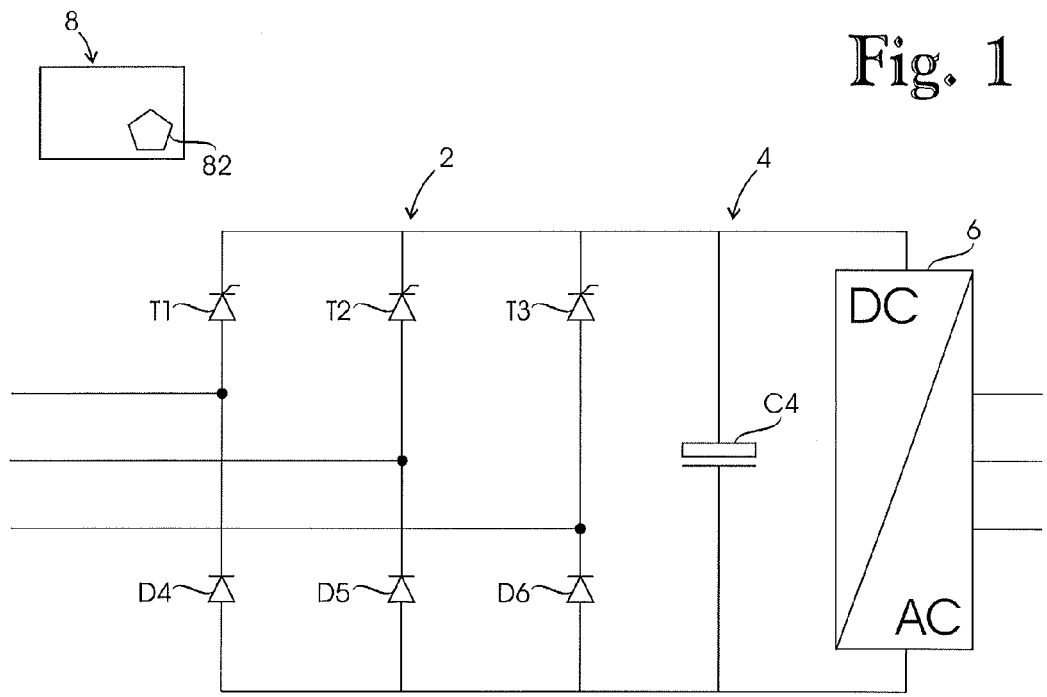
FIG. 1 shows a frequency converter assembly in accordance with an exemplary embodiment of the disclosure.

FIG. 1 shows a frequency converter assembly in accordance with an exemplary embodiment of the disclosure. The frequency converter assembly of FIG. 1 includes an input, rectifier means 2, a direct voltage intermediate circuit 4, inverter means 6, control means 8, and an output. The input can be arranged to supply electric power having an input frequency into the frequency converter assembly. The rectifier means 2 (e.g. a rectifying circuit or rectifying component as desired) can be electrically positioned between the input and the direct voltage intermediate circuit 4 and can include rectifier switches T1, T2 and T3. Each of the rectifier switches T1, T2 and T3 can be a thyristor. The rectifier means 2 can be arranged to rectify electric power having an input frequency by using the rectifier switches T1 to T3. The direct voltage intermediate circuit 4 includes capacitor means C4 (e.g. a capacitor or other capacitive element as desired). The inverter means 6 are electrically positioned between the direct voltage intermediate circuit 4 and the output. The inverter means 6 (e.g. a power inverter) can be arranged to invert electric power of the direct voltage intermediate circuit 4 into electric power having an output frequency. The control means 8 (e.g. a processor, controller, or other control signal generating component as desired) can be arranged to control the operation of the frequency converter assembly. The output can be arranged to supply electric power having an output frequency out of the frequency converter assembly.

The control means 8 can be arranged to provide a recovery function (e.g., recovery process) in which the capacitor means C4 are recovered by supplying restricted recovery current from the supply network to the capacitor means C4 through the rectifier switches T1 to T3. The recovery current can be substantially lower than the rectifier current supplied through the rectifying switches T1 to T3 to the capacitor means while the frequency converter assembly supplies alternating current to the output at its nominal power. The control means 8 can be arranged, during the recovery function, to prevent supply of electric power from the direct voltage intermediate circuit 4 by keeping the controllable switches of the inverter means 6 in an open position.

The recovery function can include a phase angle charge period during which the control means 8 control the rectifier means 2 such that each rectifier switch T1 to T3 is in a conducting state only for part of such a period during which the voltage effective over the rectifier switch has a forward direction. In an exemplary embodiment, the rectifier means 2 can be controlled during the whole of the recovery function in such a way that each rectifier switch is in a conducting state only for part of such a period during which the voltage effective over the rectifier switch has a forward direction.

During the phase angle charge period, the trigger angle of each rectifier switch T1 to T3 can be constant or it can be varied. A trigger angle can refer to the moment when the thyristor is switched on, i.e. a switch-on pulse is given to the thyristor. Each rectifier switch T1 to T3 commutates, i.e. is switched off, when the voltage effective over the rectifier switch turns reverse. In an alternative embodiment, GTO thyristors can be used which can also be switched off controllably, i.e. switching off is also possible in cases where the voltage effective over the GTO thyristor has a forward direction.

In another exemplary embodiment in addition to a phase angle charge period, the recovery function can include a pulse charge period during which each of the rectifier switches T1 to T3 are alternately in an on-state and off-state such that during each on-state, the rectifier switch is in a conducting state over such a substantially whole period during which the voltage effective over the rectifier switch has a forward direction, and during each off-state, the rectifier switch is in a non-conducting state over such a whole period during which the voltage effective over the rectifier switch has a forward direction. In other words, in an on-state the rectifier switch can be kept in a conducting state as long as possible, and in an off-state the rectifier switch is not allowed to be conductive at all.

The control means 8 includes clock means 82 (e.g. a clock, timer, or other time measurement device as desired) arranged to measure the inactive time of the capacitor means C4. The inactive time of the capacitor means C4 can be a variable from which the recovery requirement of the capacitor means C4 can be deduced. The control means 8 can be arranged, in a situation where the inactive time of the capacitor means C4 measured by the clock means 82 exceeds a predetermined recovery requirement limit value, to prevent supply of electric power from the direct voltage intermediate circuit 4 towards the output and to allow supply of electric power from the direct voltage intermediate circuit 4 towards the output only after the recovery has been completed.

The inactive time of the capacitor means C4 measured by the clock means 82 starts to pass at the moment of the manufacture of the frequency converter assembly. In an alternative embodiment, the inactive time starts to pass at the moment of the manufacture of the capacitor means.

The clock means 82 can be arranged to reset the inactive time of the capacitor means C4 in response to each valid capacitor function. A valid capacitor function is a process that is sufficient to remove a need for recovery for a time period having a length of a recovery requirement limit value. A valid capacitor function can be a recovery process or a frequency converter function meeting predetermined terms of operation. A frequency converter function meeting predetermined terms of operation refers to an operating process of the frequency converter where the frequency converter assembly supplies load connected to the output for a sufficiently long time while the voltage of the capacitor means is sufficiently high during the operation.

The rectifier means 2 of the frequency converter assembly in FIG. 1 include a three-phase half-controlled bridge assembly the switches of which are thyristors. The half-controlled bridge assembly further includes diodes D4, D5 and D6. In an alternative embodiment, the rectifier means includes a fully controlled bridge assembly having six controllable switches. It should be understood that in both a half-controlled bridge assembly and in a fully controlled bridge assembly the thyristors can be replaced with other appropriate controllable switches, such as transistors.

The disclosure is not restricted to three-phase embodiments. In another exemplary embodiment of the disclosure, a one-phase frequency converter assembly includes rectifier means implemented with one controllable switch.

In frequency converter assemblies the frequency converter means can comprise several rectifier switches. The control means can be arranged to operate all rectifier switches to provide a recovery function. In an exemplary embodiment, the control means can be designed to control the rectifier switches in such a way that all phases of the supply network are loaded substantially equally. In another exemplary embodiment, however, the control means can be arranged to provide a recovery function by using only some of the rectifier switches of the rectifier means.

Figure 2:
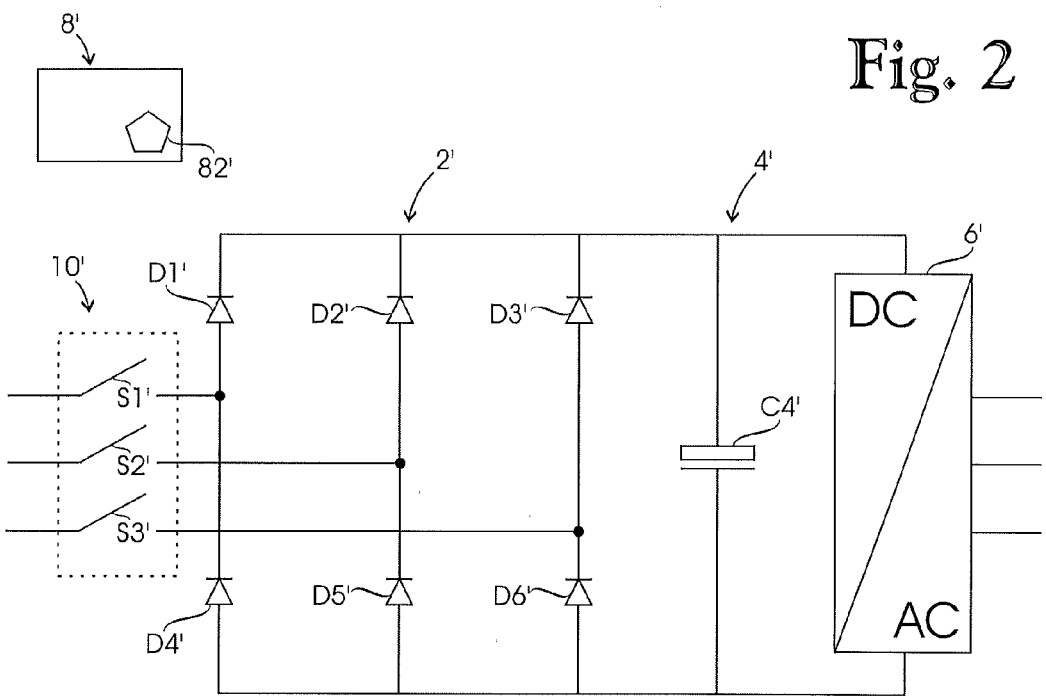
FIG. 2 shows a frequency converter assembly in accordance with another exemplary embodiment of the disclosure.

FIG. 2 shows a frequency converter assembly in accordance with another exemplary embodiment of the disclosure. As shown in FIG. 2, the frequency converter assembly includes network switch means (e.g., network switch) 10', an input, rectifier means 2', a direct voltage intermediate circuit 4', inverter means 6', control means 8' and an output. The direct voltage intermediate circuit 4' and the inverter means 6' can be identical to the direct voltage intermediate circuit 4 and the inverter means 6, respectively, as shown in FIG. 1.

The rectifier means 2' can be electrically positioned between the network switch means 10' and the direct voltage intermediate circuit 4'. The rectifier means 2' includes a diode bridge with diodes D1', D2', D3', D4', D5' and D6'. The rectifier means 2' can be arranged to rectify electric power having an input frequency by using the diodes D1' to D6'. The rectifier means 2' do not contain controllable switches.

The network switch means 10' includes switch members S1', S2' and S3', each of which is arranged to be connected to one phase of the supply network. The network switch means 10' can be selectively arranged to connect the rectifier means 2' to the electric supply network and to disconnect the rectifier means 2' from the electric supply network. The control means 8' can be arranged to provide a recovery function in which the capacitor means C4' are recovered by supplying restricted recovery current from the supply network to the capacitor means C4' through the network switch means 10'. The restricted recovery current is generated by keeping the switch members S1', S2' and S3' alternately in closed and open positions.

The control means 8' can be arranged to control the switch members S1' to S3' simultaneously in such a way that all switch members S1' to S3' are either in a closed position or in an open position. Alternatively, the control means 8' can be arranged to control the switch members S1' to S3' individually, in which case some of the switch members S1' to S3' can be closed and some open at the same moment of time. If desired, the recovery function may also be carried out by using only one switch member of the three.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A frequency converter assembly comprising:
an input for supplying electric power having an input frequency into the frequency converter assembly from a supply network;
a direct voltage intermediate circuit having capacitor means;
at least one controllable switch electrically positioned between the input and the direct voltage intermediate circuit;
an output for supplying electric power having an output frequency from the frequency converter assembly;
control means for controlling the at least one controllable switch, providing a recovery function to recover the capacitor means by supplying restricted recovery current from the supply network to the capacitor means through the at least one controllable switch, and preventing a supply of electric power from the direct voltage intermediate circuit towards the output during the recovery function; and
clock means for measuring an inactive time of the capacitor means, wherein when an inactive time of the capacitor means measured by the clock means exceeds a predetermined recovery requirement limit value, the control means prevents the supply of electric power from the direct voltage intermediate circuit towards the output and allowing supply of electric power from the direct voltage intermediate circuit towards the output only after the recovery function has been completed,
wherein the recovery function comprises a phase angle charge period during which the at least one controllable switch is arranged to be in a conducting state only for part of a period during which effective voltage over the at least one controllable switch has a forward direction.

2. The frequency converter assembly according to claim 1, comprising:
rectifier means for rectifying electric power having an input frequency by using at least one rectifier switch, wherein the rectifier means is electrically positioned between the input and the direct voltage intermediate circuit, and includes the at least one rectifier switch, which is arranged as the at least one controllable switch.

3. The frequency converter assembly according to claim 1, comprising:
rectifier means for rectifying electric power having an input frequency, wherein the rectifier means is electrically positioned between the input and the direct voltage intermediate circuit; and
network switch means for selectively connecting the rectifier means to at least one phase of the supply network and for disconnecting the rectifier means from at least one phase of the supply network, wherein the network switch means is arranged as the at least one controllable switch.

4. The frequency converter assembly according to claim 1, wherein when the inactive time of the capacitor means, measured by the clock means, starts to pass at a moment of manufacture, the clock means resets the inactive time of the capacitor means in response to a valid capacitor function, wherein the moment of manufacture is a moment of manufacture of the capacitor means or the frequency converter assembly, and wherein the valid capacitor function is a recovery process or a frequency converter function meeting predetermined terms of operation.

5. The frequency converter assembly according to claim 4, wherein the frequency converter function meets the predetermined terms of operation when a voltage of the capacitor means is over a predetermined voltage limit value for a predetermined operating time.

6. The frequency converter assembly according to claim 1, wherein the capacitor means includes at least one electrolytic capacitor.

7. A frequency converter assembly comprising:
an input for supplying electric power having an input frequency into the frequency converter assembly from a supply network;
a direct voltage intermediate circuit having capacitor means;
at least one controllable switch electrically positioned between the input and the direct voltage intermediate circuit;
an output for supplying electric power having an output frequency from the frequency converter assembly;
control means for controlling the at least one controllable switch, providing a recovery function to recover the capacitor means by supplying restricted recovery current from the supply network to the capacitor means through the at least one controllable switch, and preventing a supply of electric power from the direct voltage intermediate circuit towards the output during the recovery function; and
clock means for measuring an inactive time of the capacitor means, wherein when an inactive time of the capacitor means measured by the clock means exceeds a predetermined recovery requirement limit value, the control means prevents the supply of electric power from the direct voltage intermediate circuit towards the output and allowing supply of electric power from the direct voltage intermediate circuit towards the output only after the recovery function has been completed, wherein the recovery function comprises a pulse charge period during which the at least one controllable switch is alternately in an on-state and in an off-state such that during each on-state the at least one controllable switch is in a conducting state over such a substantially whole period during which a voltage effective over the at least one controllable switch has a forward direction, and during each off-state the at least one controllable switch is in a non-conducting state over such a whole period during which the voltage effective over the at least one controllable switch has a forward direction.

8. A method of monitoring a recovery requirement of a capacitor means in a frequency converter assembly including an input for supplying electric power having an input frequency into the frequency converter assembly from a supply network, a direct voltage intermediate circuit having a capacitor, at least one controllable switch electrically positioned between the input and the direct voltage intermediate circuit, an output for supplying electric power having an output frequency from the frequency converter assembly, a controller, and a clock, the method comprising:
controlling the at least one controllable switch;
executing a recovery process by providing a recovery function to recover the capacitor means by supplying restricted recovery current from the supply network to the capacitor through the at least one controllable switch;
preventing a supply of electric power from the direct voltage intermediate circuit towards an output of the frequency converter assembly during the recovery process; and
allowing supply of electric power from the direct voltage intermediate towards an output only after the recovery process has been completed,
wherein the recovery function comprises a phase angle charge period during which the at least one controllable switch is arranged to be in a conducting state only for part of a period during which effective voltage over the at least one controllable switch has a forward direction.

9. The method of claim 8, comprising:
rectifying electric power having an input frequency through at least one rectifier switch, which is arranged as the at least one controllable switch.

10. The method of claim 8, comprising:
selectively connecting rectifier means of the frequency converter assembly to at least one phase of the supply network.

11. The method of claim 8, comprising:
disconnecting rectifier means of the frequency converter assembly from at least one phase of the supply network.

12. The method of claim 8, comprising:
resetting an inactive time of the capacitor means in response to a valid capacitor function, when the inactive time of the capacitor means starts to pass at a moment of manufacture.

13. A frequency converter assembly comprising:
an input for supplying electric power having an input frequency into the frequency converter assembly from a supply network;
a direct voltage intermediate circuit having a capacitor;
at least one controllable switch electrically positioned between the input and the direct voltage intermediate circuit;
an output that supplies electric power having an output frequency from the frequency converter assembly;
a controller that controls the at least one controllable switch, providing a recovery function to recover the capacitor by supplying restricted recovery current from the supply network to the capacitor through the at least one controllable switch, and prevents a supply of electric power from the direct voltage intermediate circuit towards the output during the recovery function; and
a clock that measures an inactive time of the capacitor, wherein when an inactive time of the capacitor measured by the clock exceeds a predetermined recovery requirement limit value, the controller prevents the supply of electric power from the direct voltage intermediate circuit towards the output and allowing supply of electric power from the direct voltage intermediate circuit towards the output only after the recovery function has been completed,
wherein the recovery function comprises a phase angle charge period during which the at least one controllable switch is arranged to be in a conducting state only for part of a period during which effective voltage over the at least one controllable switch has a forward direction.

14. A frequency converter assembly comprising:
an input for supplying electric power having an input frequency into the frequency converter assembly from a supply network;
a direct voltage intermediate circuit having a capacitor;
at least one controllable switch electrically positioned between the input and the direct voltage intermediate circuit;
an output that supplies electric power having an output frequency from the frequency converter assembly;
a controller that controls the at least one controllable switch, providing a recovery function to recover the capacitor by supplying restricted recovery current from the supply network to the capacitor through the at least one controllable switch, and prevents a supply of electric power from the direct voltage intermediate circuit towards the output during the recovery function; and
a clock that measures an inactive time of the capacitor, wherein when an inactive time of the capacitor measured by the clock exceeds a predetermined recovery requirement limit value, the controller prevents the supply of electric power from the direct voltage intermediate circuit towards the output and allowing supply of electric power from the direct voltage intermediate circuit towards the output only after the recovery function has been completed,
wherein the recovery function comprises a pulse charge period during which the at least one controllable switch is alternately in an on-state and in an off-state such that during each on-state the at least one controllable switch is in a conducting state over such a substantially whole period during which a voltage effective over the at least one controllable switch has a forward direction, and during each off-state the at least one controllable switch is in a non-conducting state over such a whole period during which the voltage effective over the at least one controllable switch has a forward direction.

15. The frequency converter assembly according to claim 14, comprising:
a rectifier that rectifies electric power having an input frequency by using at least one rectifier switch, wherein the rectifier is electrically positioned between the input and the direct voltage intermediate circuit, and includes the at least one rectifier switch, which is arranged as the at least one controllable switch.

16. The frequency converter assembly according to claim 14, comprising:

a rectifier that rectifies electric power having an input frequency, wherein the rectifier is electrically positioned between the input and the direct voltage intermediate circuit; and a network switch that selectively connects the rectifier to at least one phase of the supply network and that disconnects the rectifier from at least one phase of the supply network, wherein the network switch is the at least one controllable switch.

17. The frequency converter assembly according to claim 14, wherein when the inactive time of the capacitor, measured by the clock, starts to pass at a moment of manufacture, the clock resets the inactive time of the capacitor in response to a valid capacitor function, wherein the moment of manufacture is a moment of manufacture of the capacitor or the frequency converter assembly, and wherein the valid capacitor function is a recovery process or a frequency converter function meeting predetermined terms of operation.

18. The frequency converter assembly according to claim 17, wherein the frequency converter function meets the predetermined terms of operation when a voltage of the capacitor is over a predetermined voltage limit value for a predetermined operating time.

19. A method of monitoring a recovery requirement of a capacitor means in a frequency converter assembly including an input for supplying electric power having an input frequency into the frequency converter assembly from a supply network, a direct voltage intermediate circuit having a capacitor, at least one controllable switch electrically positioned between the input and the direct voltage intermediate circuit, an output for supplying electric power having an output frequency from the frequency converter assembly, a controller, and a clock, the method comprising:

controlling the at least one controllable switch;

executing a recovery process by providing a recovery function to recover the capacitor means by supplying restricted recovery current from the supply network to the capacitor through the at least one controllable switch;

preventing a supply of electric power from the direct voltage intermediate circuit towards an output of the frequency converter assembly during the recovery process; and allowing supply of electric power from the direct voltage intermediate towards an output only after the recovery process has been completed, wherein the recovery function comprises a pulse charge period during which the at least one controllable switch is alternately in an on-state and in an off-state such that during each on-state the at least one controllable switch is in a conducting state over such a substantially whole period during which a voltage effective over the at least one controllable switch has a forward direction, and during each off-state the at least one controllable switch is in a non-conducting state over such a whole period during which the voltage effective over the at least one controllable switch has a forward direction.

* * * * *